United States Patent
Atarius et al.

(10) Patent No.: US 7,065,130 B1
(45) Date of Patent: Jun. 20, 2006

(54) SEARCHING FOR SIGNALS IN A COMMUNICATIONS SYSTEM

(75) Inventors: Roozbeh Atarius, Cary, NC (US); Håkan Eriksson, Lund (SE); Torgny Palenius, Löddeköpinge (SE); Christer Östberg, Staffanstorp (SE); Torsten Carlsson, Lund (SE); Kjell Gustafsson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 676 days.

(21) Appl. No.: 09/678,165

(22) Filed: Oct. 2, 2000

(51) Int. Cl.
H04B 15/00 (2006.01)
H04K 1/00 (2006.01)
H04L 27/30 (2006.01)

(52) U.S. Cl. ................................ 375/150; 375/152
(58) Field of Classification Search ........... 375/130, 375/140, 143, 144, 147, 148, 152; 370/335, 370/342, 441
See application file for complete search history.

(56) References Cited

U.S. PATENT DOCUMENTS

| | | | | |
|---|---|---|---|---|
| 5,442,661 A | | 8/1995 | Falconer | 375/205 |
| 5,581,579 A | * | 12/1996 | Lin et al. | 375/331 |
| 5,828,705 A | * | 10/1998 | Kroeger et al. | 375/326 |
| 5,872,810 A | * | 2/1999 | Philips et al. | 375/222 |
| 5,901,183 A | * | 5/1999 | Garin et al. | 375/343 |
| 6,212,566 B1 | * | 4/2001 | Vanhoof et al. | 709/230 |
| 6,295,325 B1 | * | 9/2001 | Farrow et al. | 375/327 |
| 6,307,877 B1 | * | 10/2001 | Philips et al. | 375/130 |
| 6,542,562 B1 | * | 4/2003 | Ostberg et al. | 375/350 |
| 6,597,727 B1 | * | 7/2003 | Philips et al. | 375/147 |
| 6,643,275 B1 | * | 11/2003 | Gustafsson et al. | 370/328 |
| 6,658,048 B1 | * | 12/2003 | Valio | 375/150 |
| 6,680,967 B1 | * | 1/2004 | Westman | 375/148 |

FOREIGN PATENT DOCUMENTS

| | | |
|---|---|---|
| EP | 0 757 450 A2 | 2/1997 |
| WO | WO 00/21201 A3 | 4/2000 |
| WO | WO00/21201 A2 | 4/2000 |

OTHER PUBLICATIONS

EPO: Standard European Search Report; Jul. 3, 2001.

* cited by examiner

Primary Examiner—Jean B. Corrielus

(57) ABSTRACT

A method and system enables matched filters of a CDMA system to be simplified using a two stage search. A course stage and a fine stage jointly produce the location(s) of received signal path-rays. In a first stage, an oversampled digital signal is decimated, and the decimated signal is applied to a matched filter to eventually produce an approximate location. In a second stage, the oversampled signal is shifted based on the determined approximate location and then correlated to a generated code, and a more-exact location is selected from the outputs of the correlations. Alternatively, a shifted version of the generated code is correlated to the oversampled signal, and the more-exact location is selected from the outputs of those correlations.

27 Claims, 6 Drawing Sheets

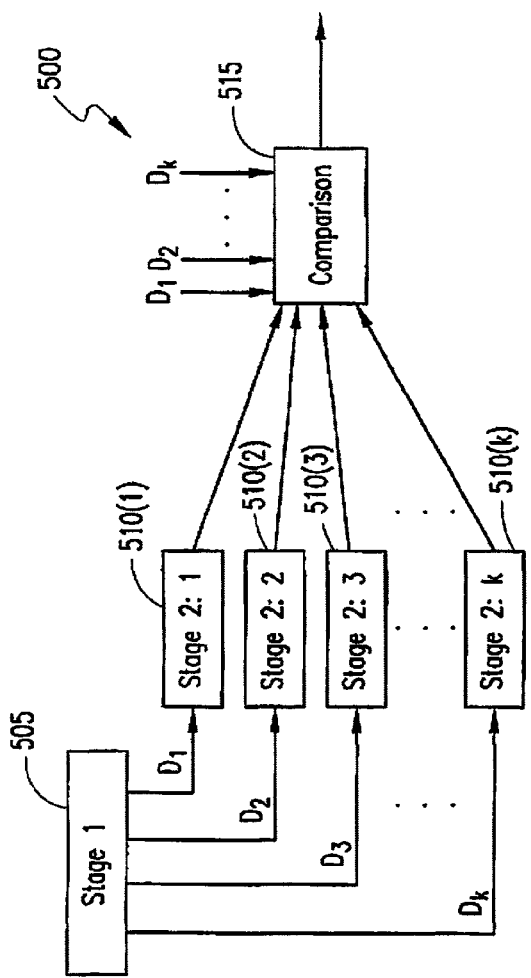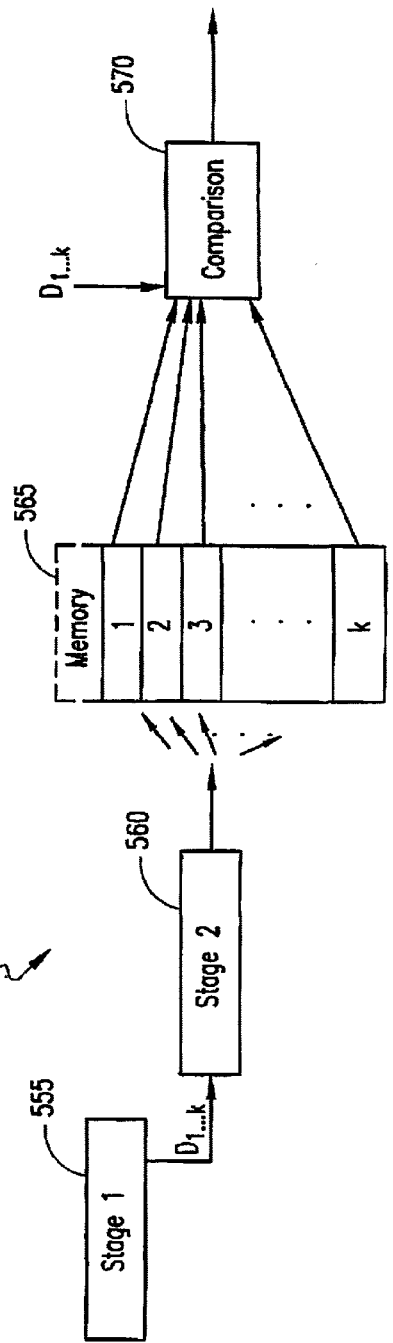
FIG. 5A
FIG. 5B

SEARCHING FOR SIGNALS IN A COMMUNICATIONS SYSTEM

BACKGROUND OF THE INVENTION

1. Technical Field of the Invention

The present invention relates in general to the field of communications, and in particular, by way of example but not limitation, to tuning to signal path-rays in a wireless communications system such as a Code Division Multiple Access (CDMA) system.

2. Description of Related Art

Mobile wireless communication is becoming increasingly important for providing safety, convenience, improved productivity, and simple conversational pleasure to subscribers of wireless communications services. One prominent mobile wireless communication option is cellular communication. Cellular phones, for instance, can be found in cars, briefcases, purses, and even pockets. With the proliferation of cellular phone users and the types of services offered, new wireless system standards are being developed to meet these demands.

For example, CDMA, Wideband-CDMA (W-CDMA), etc. are being implemented to improve spectral efficiency and introduce new features. In CDMA or W-CDMA (jointly referred to as "CDMA" hereafter), signal fading is combated by combining multiple received diverse signal path-rays in a RAKE receiver. Locations (in time) of the signal path-rays are first found by using a searcher. Subsequently, these path-rays are combined by using a maximum ratio combiner (MRC). Searchers are conventionally implemented as one or more matched filters and a peak detector. The signal path-rays are matched to a certain pilot sequence, which results in peaks that indicate the locations of the various path-rays. The peak detector detects these resulting peaks.

Realizing a searcher is a computationally complex endeavor; therefore, it is desirable to detect the path-rays only once. After detection, the path-rays are consequently tracked as long as possible by using a path-ray tracker. The tracking is continued until the quality of the received signal reaches (e.g., falls) to a predetermined threshold. Thereafter, the tracking is ceased and a new search is initiated. The computational complexity of a searcher results from, at least in part, the number of delay candidates that the searcher must consider in order to locate the path-rays. The greater the number of delay candidates, the greater the cost in terms of hardware, processing time, power consumption, silicon real estate, etc. Hence, there is a need for a means to reduce the total number of delay candidates that must be considered by the searcher when locating the diverse signal path-rays.

SUMMARY OF THE INVENTION

The needs of the prior art are met by the method and system of the present invention. For example, as heretofore unrecognized, it would be beneficial to reduce the total number of delay candidates that must be considered by a searcher of a receiver when locating diverse signal path-rays. In fact, it would be beneficial if a searcher divided the matching process into coarse signal matching and fine signal matching to reduce the number of delay elements involved in computing the location of signal path-rays.

The present invention is related, in one embodiment, to searching for signal path-rays in a CDMA system. The invention is directed to conducting a primary coarse search for the signal path-rays to determine their general location(s) and thereafter to performing a secondary fine search to determine their precise location(s).

The method and system of the present invention is directed, in general, to simplifying the matched filters in a CDMA receiver. The matched filters are simplified by reducing the number of delay candidates that must be addressed when searching for location(s) of path-rays of a signal to be received. The simplification of the matched filters is accomplished by implementing a two-stage signal path-ray location searcher. A first coarse stage locates an approximate location of a signal path-ray. A second finer stage locates the signal path-ray more precisely. The more-exact location(s) may subsequently be forwarded to a set of rake fingers in a spread spectrum receiver.

In one embodiment, an analog received signal is oversampled in an analog-to-digital conversion. In other words, the analog signal is sampled more than once per chip. This oversampled signal is then decimated to reduce the number of entries in the digital signal. The decimated signal is applied to matched filters, which may be composed of at least one finite impulse response (FIR) filter. A peak detector detects an approximate location from the output of the FIR filter.

The oversampled signal is shifted responsive to the determined approximate location(s). A code generator generates a code corresponding to expected data to be received. The shifted oversampled signal is correlated to the generated code, and a comparator selects the more-exact location from the results of the set of correlations. In another embodiment, the generated code is shifted and then correlated to the oversampled signal. Again, a comparator selects the more-exact location from the results of the set of correlations.

The technical advantages of the present invention include, but are not limited to the following. It should be understood that particular embodiments may not involve any, much less all, of the following exemplary technical advantages.

An important technical advantage of the present invention is that it reduces the complexity of a searcher in a CDMA receiver by reducing the number of delay elements that the searcher must use. This consequently reduces power consumption and decreases the amount of silicon space occupied by the searcher.

Another important technical advantage of the present invention is that it enables searching to be effectuated using a two-stage scheme, thereby simplifying the complexity of computations associated with the first stage.

Yet another important technical advantage of the present invention is the ability to first detect path-rays with a coarse time resolution and subsequently determine the locations of the path-rays by tuning to them with a better resolution.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the method and system of the present invention may be had by reference to the following detailed description when taken in conjunction with the accompanying drawings wherein:

FIG. 5A illustrates an exemplary higher-level diagram of signal path-ray detection for the exemplary embodiments of FIGS. 4A and 4B in accordance with the present invention;

FIG. 5B illustrates another exemplary higher-level diagram of signal path-ray detection for the exemplary embodiments of FIGS. 4A and 4B in accordance with the present invention.

DETAILED DESCRIPTION OF THE DRAWINGS

In the following description, for purposes of explanation and not limitation, specific details are set forth, such as particular circuits, logic modules implemented in, for example, software, hardware, firmware, etc.), techniques, etc. in order to provide a thorough understanding of the invention. However, it will be apparent to one of ordinary skill in the art that the present invention may be practiced in other embodiments that depart from these specific details. In other instances, detailed descriptions of well-known methods, devices, logical code (hardware, software, firmware, etc.), etc. are omitted so as not to obscure the description of the present invention with unnecessary detail.

Preferred embodiments of the present invention and its advantages are best understood by referring to FIGS. 1–6 of the drawings, like numerals being used for like and corresponding parts of the various drawings. It should be understood that the FIGURES reflect both the real (I) and the complex (Q) portions of the overall signal value(s) (I+jQ).

Aspects of the air interface for the International Mobile Telecommunications 2000 (IMT-2000), a so-called third generation standard, is used to describe an embodiment of the present invention. However, it should be understood that the principles of the present invention are applicable to other wireless (or wireline) communication standards (or systems), especially those that employ spread spectrum technology, such as those based on some type of Code Division Multiple Access (CDMA) scheme, such as Direct Sequence (DS) CDMA (e.g., W-CDMA, IS-95-A, etc.), Frequency Hopped (FH) CDMA, time-dodging CDMA, Frequency-Time Dodging (F-TD) CDMA, etc., all of which are generally referred to herein as CDMA.

Figure 1:
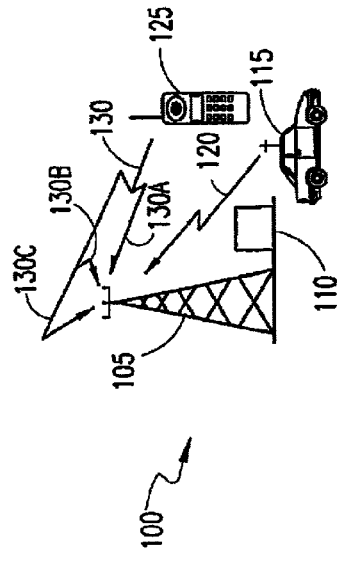
FIG. 1 illustrates an exemplary section of a wireless communications system in accordance with the present invention.

Referring now to FIG. 1, an exemplary section of a wireless communications system in accordance with the present invention is illustrated generally at 100. The (section of) wireless communications system 100 includes a base station transmit/receive antenna 105, a base station transmitter/receiver (i.e., a transceiver (TRX)) section 110, and multiple mobile stations 115 and 125. Although only two mobile stations 115 and 125 are shown in FIG. 1, it should be understood that the wireless communications system 100 may include more than two mobile stations. Also illustrated are transmission 120 (from the mobile station 115) and transmission 130 (from the mobile station 125). As is known in the art, reflections, delays, etc. cause multiple signals (e.g., transmission signals 130A, 130B, and 130C) of a transmission (e.g., the transmission 130) to be received by the base station transmit/receive antenna 105 and subsequently processed by the base station TRX section 110.

Figure 2:
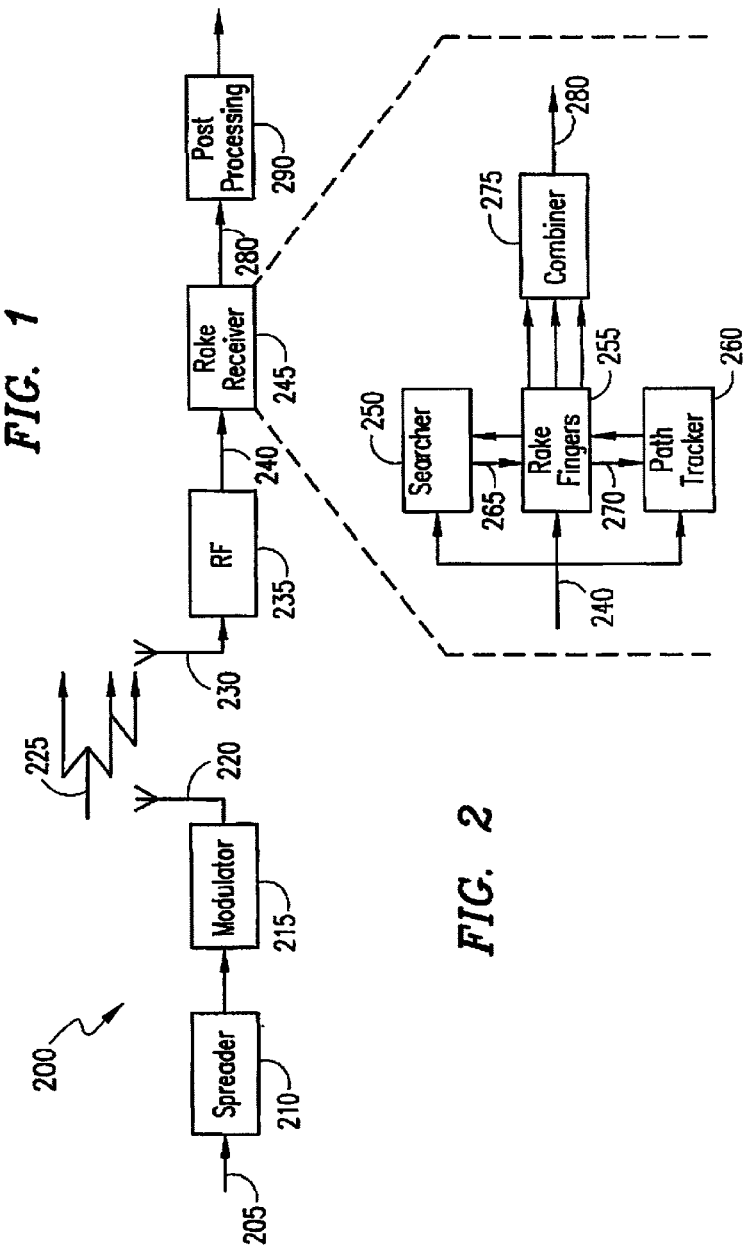
FIG. 2 illustrates exemplary transmission/reception apparatus for the wireless communications system of FIG. 1 in accordance with the present invention.

Referring now to FIG. 2, exemplary transmission/reception apparatus for the wireless communications system of FIG. 1 in accordance with the present invention is illustrated generally at 200. An information-carrying signal 205 is input to a spreader 210, which spreads the signal 205 over a wide frequency range. The spread signal is modulated at a modulator 215 and subsequently transmitted from an antenna 220. The antenna 220 may be, for example, an antenna of one of the mobile stations 115 and 125. The transmission 225 is received (in several different signals (e.g., signal path-rays) that arrive at varying times) at an antenna 230. The antenna 230 may be, for example, the base station transmit/receive antenna 105. It should be noted, however, that the (receiving) antenna 230 may correspond to a mobile station and that the (transmitting) antenna 220 may correspond to a base station in accordance with the principles of the present invention. Thus, the two-stage searching principles of the present invention may also be implemented in conjunction with a receiver of a mobile station, for example.

Continuing now with reference to FIG. 2, the antenna 230 receives the transmission 225, which may include multiple signals. The transmission 225 is processed by the radio frequency (RF) part 235, which forwards a signal 240 to a rake receiver 245. The rake receiver 245 combines the multiple signals to achieve an improved signal 280, the improved signal 280 is thereafter forwarded to post processing 290. The rake receiver 245 includes rake fingers 255 and a combiner 275. As part of, or perhaps only associated with, the rake receiver 245 are a searcher 250 and a path tracker 260. The searcher 250, the rake fingers 255, and the path tracker 260 receive as input(s) the signal(s) 240, which include the multiple signals of transmission 225.

The searcher 250, in accordance with the present invention, implements a two stage searching scheme to locate one or more of the multiple signals of the signal(s) 240 as is described in greater detail below with reference to FIGS. 4–6. The searcher 250 communicates the determined location(s) to the rake fingers 255 along line 265. Once the searcher 250 has located the signal path-rays, the path tracker 260 attempts to track them as long as is possible. The various adjustments that are made to continue tracking the signal path-rays are communicated to the rake fingers 255 from the path tracker 260 along line 270. Using the location and tracking information from lines 265 and 270, respectively, the rake fingers 255 extract the signal path-rays by despreading the received information in manner(s) known in the art. The extracted signal path-rays are output to a combiner 275, which may utilize maximum ratio combining (MRC) to produce the improved signal 280.

Figure 3:
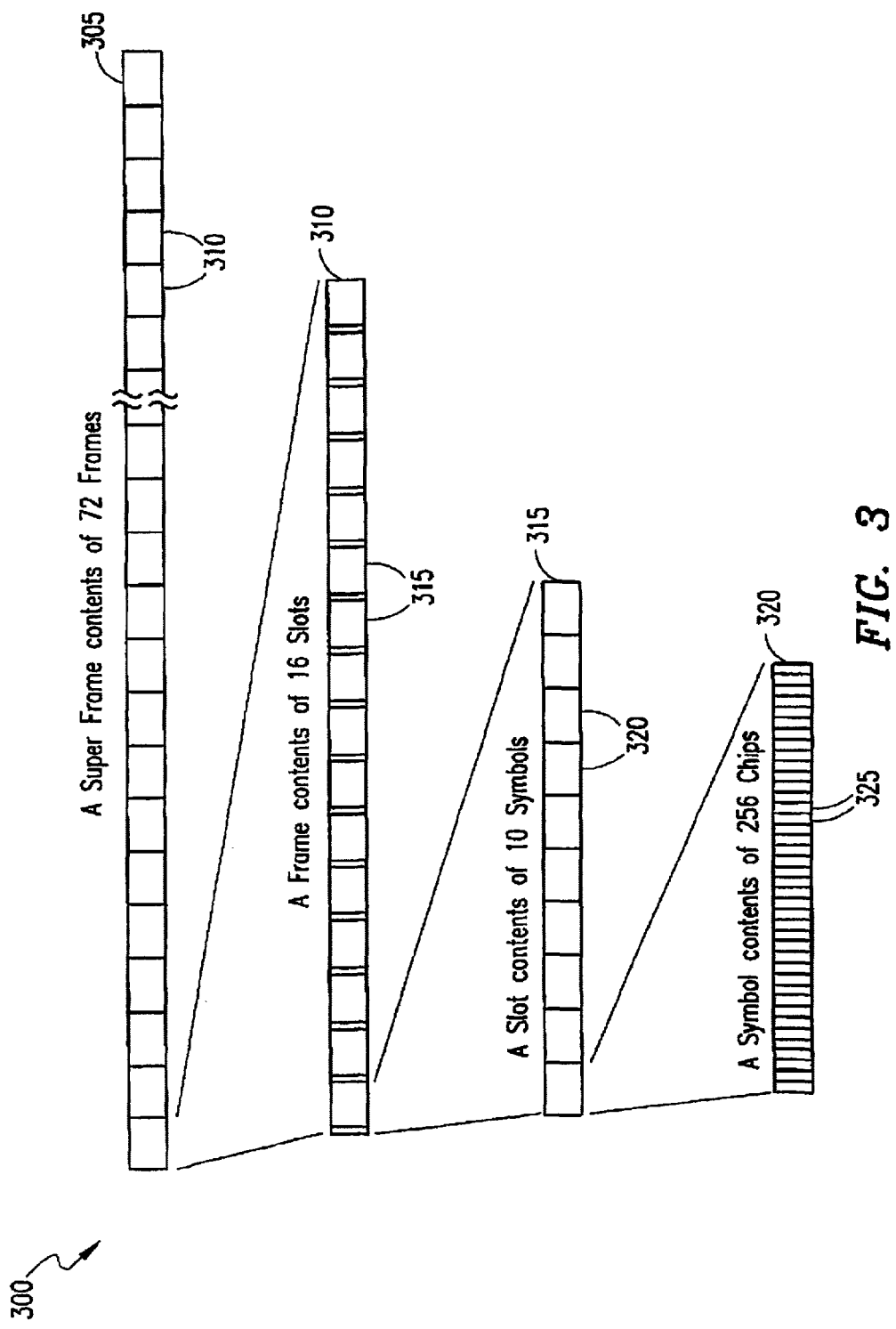
FIG. 3 illustrates an exemplary air interface format for an embodiment in accordance with the present invention.

Referring now to FIG. 3, an exemplary air interface format for an embodiment in accordance with the present invention is illustrated generally at 300. In CDMA systems data is segmented into portions with predetermined durations as specified by the given CDMA standard. These portions in turn are segmented into smaller and smaller parts until the smallest part, the chip, is reached. Specifically, the segmentation of information in the Broad Cast CHannel (BCCH) according to the IMT-2000 standard, which is a W-CDMA standard, is illustrated at 300. A super frame 305 has a duration of 720 ms and is divided into seventy-two (72) frames 310. Each frame 310 is segmented into fifteen

(15) slots 315, while each slot 315 is further segmented into ten (10) symbols 320. Ultimately, the symbols 320 are each composed of two hundred and fifty-six (256) chips 325.

Radio waves propagate a calculable distance during each chip depending on the duration of the chip. For example, radio waves propagate approximately 78.0 m in a duration corresponding to one chip 325 under the W-CDMA IMT2000 standard. In the W-CDMA IMT2000 standard, one chip 325 duration is defined to be 0.26 μs long. Thus, $3 \cdot 10^8$ ml/s×$0.26 \cdot 10^{-6}$ s=78.0 m, where the quantity $3 \cdot 10^8$ m/s equates to the speed of the radio waves. Within such a distance as 78.0 m, several path-rays may arrive at a CDMA receiver. Consequently, the received data is typically digitized by oversampling the chips in order to increase the resolution for the detection of the arrival times of the path-rays. Although the oversampling enhances the performance of the searcher, it also unfortunately increases the complexity thereof because the matched filters must consequently address a greater number of delay elements as a result of the oversampling. This complexity is disadvantageous to the extent it increases hardware requirements and/or processing time.

Figure 4A:
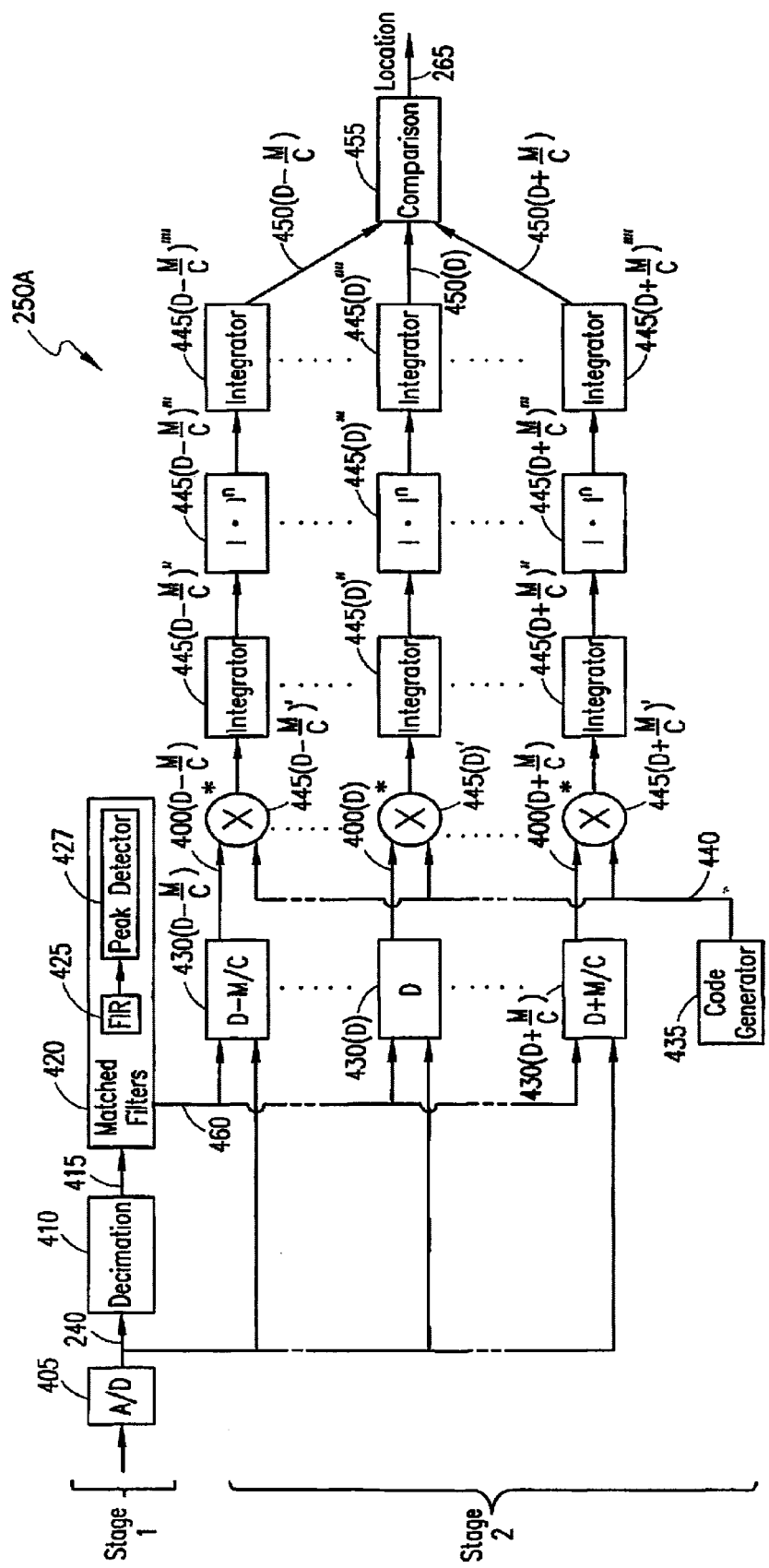
FIG. 4A illustrates signal path-ray detection for an exemplary embodiment in accordance with the present invention.
Figure 4B:
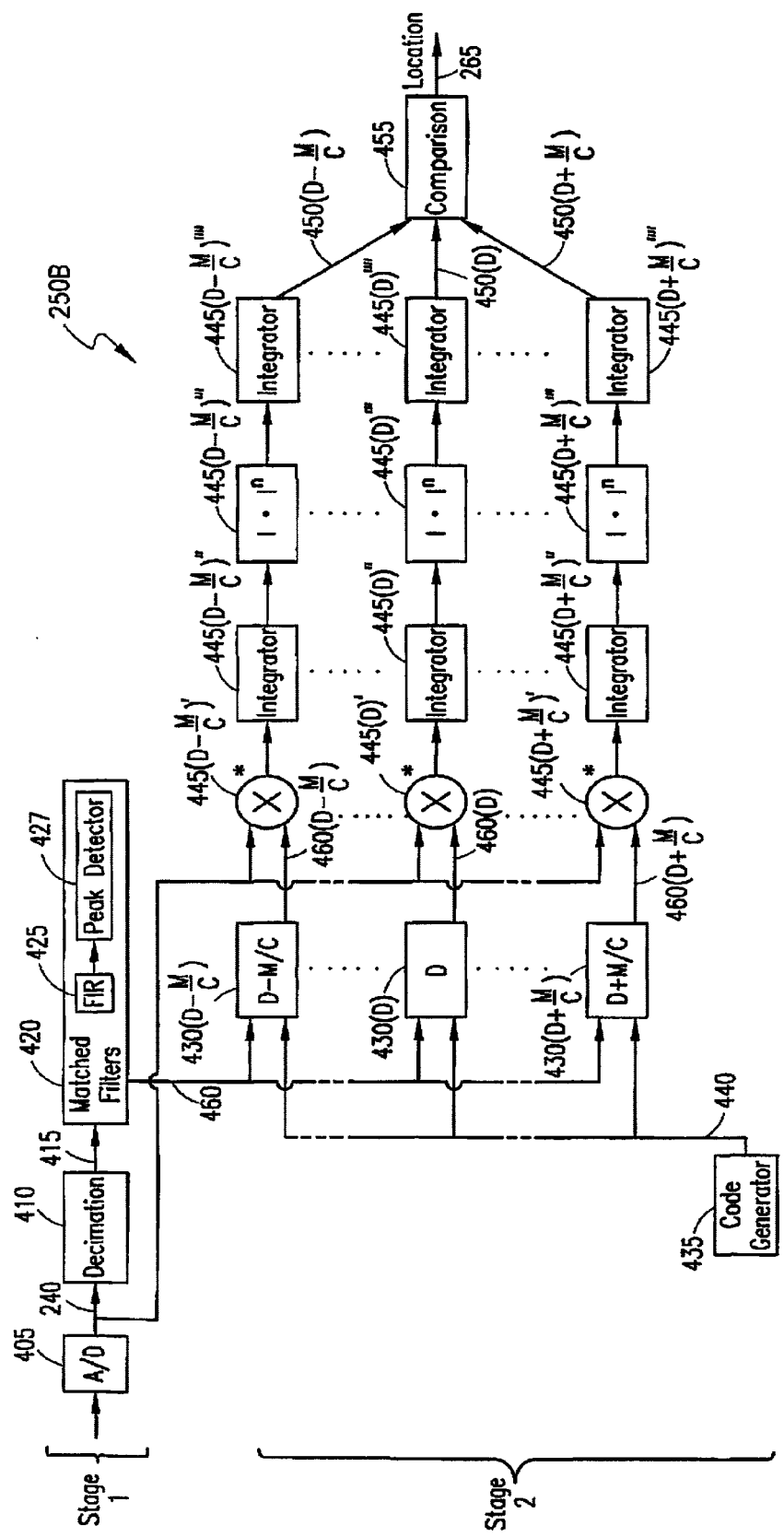
FIG. 4B illustrates signal path-ray detection for another exemplary embodiment in accordance with the present invention.

Referring now to FIG. 4A, signal path-ray detection for an exemplary embodiment in accordance with the present invention is illustrated generally at 250A. The searcher 250A detects signal path-rays when the undecimated received data is shifted and correlated to the generated code. Referring now to FIG. 4B, signal path-ray detection for another exemplary embodiment in accordance with the present invention is illustrated generally at 250B. The searcher 250B detects signal path-rays when the generated code is shifted and correlated to the undecimated received data.

As noted above, in order to increase the resolution for the detection of the path-rays' arrival times in a CDMA system, the received data is preferably oversampled several (e.g., at least more than one) times per chip. The oversampling rate may be defined as the number of times per chip that a received signal is sampled. This oversampling causes a need for increased complexity of the matched filter(s) because more delay elements are required for the implementation. In accordance with the principles of the present invention, however, this increased complexity is circumvented (e.g., reduced) by dividing the matching process/device into two (2) stages: coarse signal matching (denoted "Stage 1") and fine signal matching (denoted "Stage 2").

Continuing now with the searchers 250A and 250B of FIGS. 4A and 4B, respectively, the coarse signal matching ("Stage 1") is described. One purpose of the coarse signal matching is to locate the signal path-rays approximately. First, however, the incoming signal transmission(s) 225 (of FIG. 2) are converted from analog-to-digital using an A/D converter 405 by oversampling several times per chip. This A/D converter 405 may, for example, be part of the RF part 235, the rake receiver 245, or some other part (not shown). (Therefore, signal 240 may be always digital (e.g., if the A/D converter 405 is part of the RF part 235 (of FIG. 2)) or may be analog at one point and digital at a later point (e.g., if the A/D converter 405 is part of the rake receiver 245).) The (now digital) signal 240 is decimated at a decimation part 410 in order to produce a decimated signal 415, which has fewer elements as compared to the number of elements of which the signal 240 is composed. The decimated signal 415 is then applied to the matched filters 420. The matched filters 420 may be matched to the pilot signal of the signal transmissions) 225.

The matched filters 420 may employ at least one FIR filter 425 to locate the signal path-rays approximately. Alternatively, it could, for example, employ a bank of correlators, etc. The decimated signal 415 (e.g., instead of the (digital) signal 240) is provided to the FIR filter 425 to reduce the total number of delay elements to be addressed by the FIR filter 425. The approximate location of the signal path-rays may be determined by applying a peak detector 427 to the output of the matched filters 420. The matched filters 420 of the coarse signal matching produce a detected approximate location 460 (e.g., from the output of the peak detector 427).

The decimation factor for the decimation part 410 is preferably equal to or less than the oversampling rate of the A/D converter 405. If the decimation factor is less than the oversampling rate, then the FIR matched filters are still able to detect the signal path-rays with a resolution that is higher than the chip resolution. If, on the other hand, the decimation factor is equal to or larger than the oversampling rate, the filter detects the signal path-rays with a resolution that is equal to or less than, respectively, the chip resolution.

Continuing now with the searchers 250A and 250B of FIGS. 4A and 4B, respectively, the fine signal matching ("Stage 2") is described. The fine signal matching is performed using the approximate location(s) of the signal path-rays detected by the coarse signal matching The approximate location(s) is (are) provided as one or more delay candidates (as represented by "D") from the coarse signal matching. A code generator generates a pattern of the expected data at these approximate location(s), and this generated code pattern is correlated to the undecimated received data having the (over)sampled resolution. In one exemplary embodiment (e.g., as illustrated in the searcher 250A of FIG. 4A), the exact location(s) of the signal path-rays are detectable by shifting the undecimated received data having the (over)sampled resolution and then correlating to the generated code pattern. The exact location of the signal path-rays is determinable by comparing the resulting correlation values. In another exemplary embodiment (e.g., as illustrated in the searcher 250B of FIG. 4B), the exact location(s) of the signal path-rays are detectable by shifting the generated code pattern and then correlating to the undecimated received data having the (over)sampled resolution. The exact location of the signal path-rays is determinable by comparing the resulting correlation values, the selected one(s) of which may be forwarded as output(s).

Continuing now with FIGS. 4A and 4B, the fine signal matching ("Stage 2") is performed using the detected approximate location(s) 460 (e.g., the delay candidate(s) "D") of the signal path-rays received from the coarse signal matching ("Stage 1"). A code generator 435 generates a pattern of the expected data as generated code data 440. With reference now only to FIG. 4A, the detected approximate location(s) 460 ("D") and the (over)sampled signal 240 are applied to shifters 430(D−M/C) . . . 430(D) . . . 430(D+M/C), which delay (e.g., by shifting) the (over)sampled signal 240 from "−M/C" to "+M/C" units. The unit "C", as explained further hereinbelow with reference to Tables 1–3, relates to the (sub)chip resolution. More specifically, in certain embodiment(s), "C" is proportional to the inverse of the (sub)chip resolution. For example, if a particular embodiment operates on quarter chip resolution, then "C" is equal to four (4) in that particular embodiment. The shifters 430(D−M/C) . . . 430(D) . . . 430(D+M/C) produce as output the shifted (over)sampled signals 400(D−M/C) . . . 400(D . . . 400(D+M/C). The shifted (over)sampled signals 400(D−M/C) . . . 400(D) . . . 400 (D+M/C) and the generated code data 440 are correlated in the correlation elements 445. With reference now only to FIG. 4B, the detected approximate location(s) 460 ("D") and the generated code data 440 are applied to shifters 430(D−M/C) . . . 430(D) . . . 430 (D+M/C), which delay (e.g., by shifting) the generated code data 440 from "−M/C" to "+M/C" units. The shifters 430(D−M/C) . . . 430(D) . . . 430(D+M/C) produce as output the shifted generated code data 460(D−M/C) . . . 460(D) . . . 460(D+M/C). The shifted generated code data 460(D−M/C) . . . 460(D) . . . 460(D+M/C) and the (over) sampled signal 240 are correlated in the correlation elements 445.

Continuing now jointly with the searchers 250A and 250B of FIGS. 4A and 4B, respectively, the values to be correlated (e.g., the shifted (over)sampled signals 400(D−M/C) . . . 400(D) . . . 400(D+M/C) and the generated code data 440 in the searcher 250A, and the shifted generated code data 460(D−M/C) . . . 460(D) . . . 460(D+M/C) and the (over) sampled signal 240 in the searcher 250B) are applied to the correlation elements 445. Specifically, associated with each one of the shifters 430(D−M/C) . . . 430(D) . . . 430(D+M/C) is a mixing detector 445(D−M/C)' . . . 445(D)' . . . 445(D+M/C)' (e.g., which may be a multiplying mixer, etc.) that receives the values to be correlated. Correlation is accomplished by applying the output(s) of the mixing detectors 445(D−M/C)' . . . 445(D)' . . . 445(D+M/C)' to a corresponding set of (i) coherent integrators 445(D−M/C)" . . . 445(D)" . . . 445(D+M/C)" (e.g., each of which may be a low-pass or bandpass quenchable narrow-band filter, etc.), (ii) magnitude-taking parts 445 (D−M/C)'" . . . 445(D)'" . . . 445 (D+M/C)'", and (iii) non-coherent integrators 445(D−M/C)"" . . . 445(D)"" . . . 445(D+M/C)"".

The magnitude-taking parts 445(D−M/C)'" . . . 445(D)'" . . . 445(D+M/C)'" take the magnitude of the signal if n=1, the magnitude squared if n=2, etc. The magnitude-taking part is used to enable non-coherent integration by taking away the phase of the signal. Consequently, robust integration may be achieved because phase variations in the channel do not affect the result. This protection from phase variations can be accomplished, for example, by squaring the signal (when n=2) or by merely taking the magnitude (when n=1). The latter (i.e., magnitude-taking) is advantageously cheaper to implement in terms of silicon area and power consumption while the former (i.e., squaring) advantageously provides slightly better performance. The correlation values 450(D−M/C) . . . 450(D) . . . 450 (D+M/C) are output from the non-coherent integrators 445(D−M/C)"" . . . 445(D)"" . . . 445(D+M/C)"". A comparison part 455 selects the highest correlation value from among the correlation values 450(D−M/C) . . . 450(D) . . . 450(D+M/C) and forwards it as a more-exact, fine location output on line 265. The comparison part 455 may select the correlation value from among the correlation values 450(D−M/C) . . . 450(D) . . . 450(D+M/C) that has the largest value. Alternatively, a more-complicated scheme, for example, may be employed to choose the best candidate.

Referring now to FIG. 5A, an exemplary higher-level diagram of signal path-ray detection for the exemplary embodiments of FIGS. 4A and 4B in accordance with the present invention is illustrated generally at 500. The searcher 500 operates in parallel. Referring now to FIG. 5B, another exemplary higher-level diagram of signal path-ray detection for the exemplary embodiments of FIGS. 4A and 4B in accordance with the present invention is illustrated generally at 550. The searcher 550 operates in series. Each of the searchers 500 and 550 begin with "Stage 1" (as identified above with reference to FIGS. 4A and 4B) blocks 505 and 555, respectively. Each of the searchers 500 and 550 include one or more "Stage 2"s. It should be noted that "Stage 2" for the searchers 500 and 550 need not include the comparison parts 455 of the searchers 250A and 250B (of FIGS. 4A and 4B, respectively) because their function may be accomplished by the comparison parts 515 and 570 of the searchers 500 and 550, respectively.

"Stage 1" blocks 505 and 555 produce a number of delay candidates $D_1 \ldots D_k$. The value of "k" may be, for example, five (5) or six (6). In the searcher 500, the delay candidates $D_1 \ldots D_k$ are produced by the "Stage 1" block 505 approximately simultaneously and sent as a vector to the "Stage 2" (as identified above with reference to FIGS. 4A and 4B) blocks 510. The "Stage 2" blocks 510(1) . . . 510(k) each produce an output for a total of "k" outputs that are subsequently compared in the comparison part 515, which also receives as input the delay candidates $D_1 \ldots D_k$. In the searcher 550, the delay candidates $D_1 \ldots D_k$ are produced by the "Stage 1" block 555 approximately simultaneously and sent as a vector to the "Stage 2" block 560. The "Stage 2" block 560 is operated repeatedly (e.g., in serial) "k" times. The serially-produced "k" outputs of the "Stage 2" block 560 are placed in a memory 565 in locations 1 . . . k, respectively. Because each of these "k" outputs actually include "2M+1" (sub)outputs, each memory location 1 . . . k of the memory 565 may contain "2M+1" memory slots. These "k" outputs (or, more precisely, these "k*(2M+1)" outputs) are then passed in parallel to the comparison part 570, which also receives as input the delay candidates $D_1 \ldots D_k$.

With respect to both searchers 500 and 550, these "k" (or "k*(2M+1)") outputs from either the multiple "Stage 2" blocks 510(1) . . . 510(k) or the single "Stage 2", block 560 (e.g., via the memory 565) are compared in comparison parts 515 and 570, respectively. The comparison parts 515 and 570 may, for example, select the "L" largest of the "k" (or "k*(2M+1)") outputs that correspond to delay candidates that are the most significant path-rays by, e.g., studying their amplitudes, especially those that are more than one-half chip apart, as is explained hereinbelow in greater detail with reference to Table 3. These selected "L" outputs may be employed in a rake receiver (e.g., the rake receiver 245 of FIG. 2) in order to combine the corresponding signal-path rays using, for example, MRC.

An exemplary comparison for the comparison parts 515 and 570 is now described with reference to Tables 1–3 for explanatory, but not limiting, purposes. Assume that the intention is to locate two peaks (e.g., "L=2") using two (2) "Stage 2" blocks (e.g., two "Stage 2" blocks 510(1) and 510(2) or the single "Stage 2" block 560 operated twice) with each "Stage 2" block functioning at a quarter chip resolution (e.g., "C=4"). Considering the case when "M=2"; (and therefore each "Stage 2" has "2M+1" outputs), the number of correlators and thus outputs per stage is equal to five (5). In the Table 1 below, the output of a preceding "Stage 1" block 505 or 555 is given as [1, 2]. The consequential outputs of the two "Stage 2" blocks are therefore:

TABLE 1

| (L = 2; M = 2; C = 4; First Stage Output [1,2]). | | |
|---|---|---|
| | Stage 2:1 | Stage 2:2 |
| Correlator 1 | D1 − 2/C = 0.5 | D2 − 2/C = 1.5 |
| Correlator 2 | D1 − 1/C = 0.75 | D2 − 1/C = 1.75 |
| Correlator 3 | D1 = 1.0 | D2 = 2.0 |
| Correlator 4 | D1 + 1/C = 1.25 | D2 + 1/C = 2.25 |
| Correlator 5 | D1 + 2/C = 1.5 | D2 + 2/C = 2.5 |

In another example, consider that the output of the "$j^{th}$" correlator of the "$i^{th}$" "Stage 2" block is denoted as OUT(i,j) as in Table 2 below:

TABLE 2

(OUT ("$i^{th}$" "Stage 2" block, "$j^{th}$" correlator)).

| | OUT (1,j) | OUT (2,j) |
|---|---|---|
| Correlator 1 | 140 | 120 |
| Correlator 2 | 121 | 80 |
| Correlator 3 | 70 | 30 |
| Correlator 4 | 60 | 20 |
| Correlator 5 | 120 | 10 |

The final delay values to be utilized by the rake receiver may be selected by observing and analyzing these exemplary values. In this example, assume that the objective is to select the two (2) (e.g., L=2) best delay candidates. There are many possible approaches to selecting these two (2) best delay candidates. A straightforward approach is to first determine the delay value having the largest output, which is the OUT(1,1) delay candidate having a delay of 0.50 chip. Thereafter, all the outputs closer to half a chip are set equal to zero. The Table 3 below reflects this setting to zero:

TABLE 3

(OUT ("$i^{th}$" "Stage 2" block, "$j^{th}$" correlator)).

| OUT (1,1) = 140 | OUT (2,1) = 120 |
|---|---|
| OUT (1,2) = 0 | OUT (2,2) = 80 |
| OUT (1,3) = 0 | OUT (2,3) = 30 |
| OUT (1,4) = 60 | OUT (2,4) = 20 |
| OUT (1,5) = 120 | OUT (2,5) = 10 |

From the values in Table 3, the next largest output value is selected, which is the OUT(1,5) and OUT(2,1) delay candidates, where the delay is equal to 1.5 chips. This process may be repeated if more delay candidates are to be determined. In this example, the two "Stage 2" stages overlap at delays of 1.5 chips. It should be noted that this overlap may possibly be avoided by carefully adjusting the delays when they are provided to the "Stage 2" stages.

It should be understood that the elements of FIGS. 2 and 4–5 need not be discrete physical devices. They may alternatively be, for example, logic modules in which the various functions are performed by separate entities, overlapping entities, some combination thereof, etc. Furthermore, they may also be composed of one or more software programs or routines running on a general purpose microprocessor, such as a digital signal processor (DSP), or a specialized processing unit. Other possibilities for realizing the principles of the present invention will become apparent to those of ordinary skill in the art after reading and understanding this disclosure, especially with regard to FIGS. 2 and 4–6 and the text related thereto.

Figure 6:
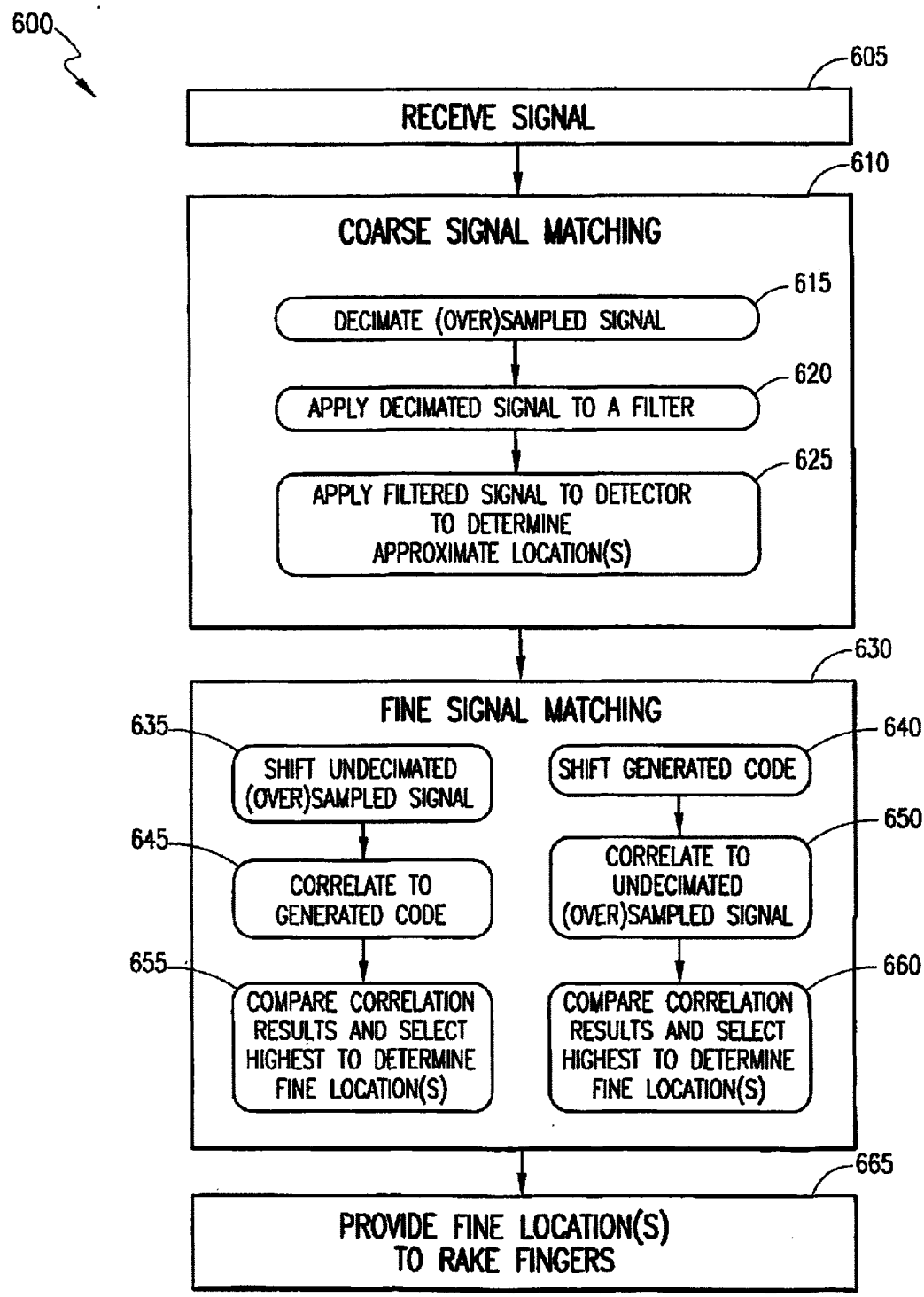
FIG. 6 illustrates an exemplary method in flowchart form for detecting signal path-rays in two stages in accordance with the present invention.

Referring now to FIG. 6, an exemplary method in flowchart form for detecting signal path-rays in two stages in accordance with the present invention is illustrated generally at 600. The flowchart 600 begins with the reception of a signal (block 605). The signal may be converted from analog-to-digital, preferably by oversampling multiple times per chip. The coarse signal matching stage (block 610) follows. As part of the coarse signal matching stage (block 610), the (over)sampled signal is decimated (block 615). The decimated signal may then be applied to a filter (block 620). The filter may be, for example, a FIR filter that is part of a set of matched filters. The filtered signal may subsequently be applied to a detector to determine approximate location(s) of the signal path-rays (block 625). The detector may, for example, be a peak detector. It should be understood that although the present invention is directed to dividing the searching process/device into two stages, at least portions of the coarse and fine signal matching stages may occur in parallel.

The fine signal matching stage (block 630) may utilize the approximate location(s) as a guideline for shifting at least one of the values to be correlated. In one exemplary embodiment, the undecimated (over)sampled signal may be shifted (block 635), and the shifted undecimated (over)sampled signal may be correlated to generated code (block 645). The correlation results may then be compared, and the highest correlation value may be selected in order to determine the fine location(s) of the signal path-rays (block 655). In another exemplary embodiment, the generated code may be shifted (block 640), and the shifted generated code may be correlated to the undecimated (over)sampled signal (block 650). The correlation results may then be compared, and the highest correlation value may be selected in order to determine the fine location(s) of the signal path-rays (block 660). After determining the fine location(s) of the signal path-rays as part of the fine signal matching stage (block 630), the fine location(s) of the signal path-rays may be provided to rake fingers (block 665) to further process the received signal.

Although preferred embodiment(s) of the method and system of the present invention have been illustrated in the accompanying Drawings and described in the foregoing Detailed Description, it will be understood that the present invention is not limited to the embodiment (s) disclosed, but is capable of numerous rearrangements, modifications, and substitutions without departing from the spirit and scope of the present invention as set forth and defined by the following claims.

What is claimed is:

1. A method for locating signal path-rays in a communications system, comprising the steps of:
    receiving a signal;
    decimating said signal to produce a decimated signal;
    processing said decimated signal to produce at least one first location having a first precision;
    processing said received signal and a generated code using said at least one first location having said first precision to produce at least one second location having a second precision, said first precision being less precise than said second precision; and
    said step of processing said signal and a generated code using said at least one first location to produce at least one second location comprises the step of shifting one of said signal and said generated code responsive to said at least one first location to create plurality of shifted variables.

2. The method according to claim 1, wherein said step of processing said signal and a generated code using said at least one first location to produce at least one second location further comprises the step of correlating said plurality of shifted variables with said non-shifted one of said signal and said generated code to produce a plurality of correlation values.

3. The method according to claim 2, wherein said step of processing said signal and a generated code using said at least one first location to produce at least one second location further comprises the step of comparing said plurality of correlation values to select said at least one second location.

4. The method according to claim 2, wherein said shifted variables comprise said signal and said non-shifted one of said signal and said generated code comprises said generated code.

5. The method according to claim 2, wherein said shifted variables comprise said generated code and said non-shifted one of said signal and said generated code comprises said signal.

6. A receiver system for locating signal path-rays in a communications system, comprising:
   a decimation part that decimates a signal in accordance with a decimation factor;
   at least one filter connected to said decimation part, said at least one filter involved in determining a first location of said signal;
   a code generator part, said code generator part adapted to generate a code pattern, wherein a version of said code pattern is an un-shifted version of said code pattern;
   at least two shifters connected to said at least one filter to receive said first location and said signal, said at least two shifters for shifting said signal to produce at least two shifted versions of said signal based on said first location; and
   at least two correlators, of each said at least one correlator correlating the at least two shifted versions of said signal to the un-shifted version of said at least one code pattern.

7. The receiver system according to claim 6, further comprising an analog-to-digital converter, said analog-to-digital converter converting said signal to a digital sampled signal prior to said decimation part decimating said signal.

8. The receiver system according to claim 7, wherein a sampling rate of said analog-to-digital converter is such that an analog version of said signal is sampled a plurality of times per chip.

9. The receiver system according to claim 8, wherein said sampling rate and said decimation factor are determinative, at least in part, of a precision of said first location.

10. The receiver system according to claim 6, further comprising a peak detector; and
    wherein said at least one filter includes at least one finite impulse response (FIR) filter, an input of said peak detector is comprised of an output of said at least one FIR filter, and said first location is comprised of an output of said peak detector.

11. The receiver system according to claim 6, wherein each of said at least two of correlators including a multiplying mixer and an integrator.

12. The receiver system according to claim 6, further comprising a comparison part; and
    wherein each of said at least two of correlators outputs a correlation value, said comparison part selects the highest value from among the output correlation values, and a second location output from said comparison part is comprised of said highest value.

13. The receiver system according to claim 12, wherein a first precision of said first location is less exact than a second precision of said second location.

14. The receiver system according to claim 6, wherein said communications system comprises a wireless Code Division Multiple Access (CDMA) communications system.

15. The receiver system according to claim 6, further comprising a comparison part and a plurality of rake fingers, said comparison part receiving an output from of each said at least two correlators and providing a second location to said plurality of rake fingers.

16. A method for locating signal path-rays in a communications system, comprising the steps of:
    receiving a signal;
    decimating said signal to produce a decimated signal;
    processing said decimated signal to produce at least one first location having a first precision;
    processing said received signal and a generated code using said at least one first location having said first precision to produce at least one second location having a second precision, said first precision being less precise than said second precision;
    said step of processing said signal further comprising the steps of:
    generating said code;
    shifting based on said first location;
    correlating said generated code to said signal, one of said generated code and said signal having been shifted in said step of shifting; and
    selecting said second location in response to said step of correlating.

17. A receiver system for locating signal path-rays in a communications system, comprising:
    a decimation part that decimates a signal in accordance with a decimation factor;
    at least one filter connected to said decimation part, said at least one filter involved in determining a first location of said signal;
    a code generator part, said code generator part adapted to generate a code pattern;
    at least two shifters connected to said at least one filter to receive said first location, said signal or said code pattern, said at least one shifter performing either:
    a shifting of said signal to produce a shifted version of said signal based on said first location; or
    a shifting of said code pattern to produce a plurality of shifted versions of said code pattern based on said first location;
    at least two correlators, each of said two correlators performing at least one of:
    correlating said shifted version of said signal to an un-shifted version of said code pattern to produce a second location, when said signal is shifted by said shifters; and
    correlating an un-shifted versions of said signal to said shifted version of said code pattern to produce said second location when said code sequence is shifted by said shifters.

18. A receiver system for locating signal path-rays in a communications system, comprising:
    a decimation part that decimates a signal in accordance with a decimation factor;
    at least one filter connected to said decimation part, said at least one filter involved in determining a first location of said signal;
    a code generator part, said a code generator part adapted to generate code pattern;
    at least two shifters connected to said at least one filter to receive said first location and said code pattern, said at least two shifters for shifting said code pattern to produce a plurality of shifted versions of said code pattern based on said first locations; and
    at least two correlators, of each said at least two correlators correlating an un-shifted version of said signal to the plurality of shifted versions of said code pattern.

19. The receiver system according to claim 18, further comprising analog-to-digital converter, said analog-to-digital converter converting said signal to a digital sampled signal prior to said decimation part decimating said signal.

20. The receiver system according to claim 19, wherein sampling rate of said analog-to-digital converter is such that an analog version of said signal is sampled a plurality of times per chip.

21. The receiver system according claim 20, wherein said sampling rate and said decimation factor are determinative, at least in part, of a precision of said first location.

22. The receiver system according to claim 18, further comprising a peak detector; and wherein said at least one filter includes at least one finite impluse response (FIR) filter, an input of said peak detector is comprised of an output of said at least one FIR filter, and said first location is comprised of an output of said peak detector.

23. The receiver system according to claim 18, wherein each of said at least two correlators including a multiplying mixer and an integrator.

24. The receiver system according to claim 18, further comprises a comparison part; and wherein each of said at least two of correlators outputs a correlation value, said comparison part selects the highest value from among the output correlation values, and a second location output from said comparison part is comprised of said highest value.

25. The receiver system according to claim 24, wherein a first precision of said first location is less exact than a second precision of said second location.

26. The receiver system according to claim 18, wherein said communications system comprises a wireless Code Division Multiple Access (CDMA) communications system.

27. The receiver system according to claim 18, further comprising a comparison part and a plurality of rake fingers, said comparison part receiving an output from each of said at least two correlators and providing a second location to said plurality of rake fingers.

* * * * *

UNITED STATES PATENT AND TRADEMARK OFFICE
CERTIFICATE OF CORRECTION

PATENT NO. : 7,065,130 B1
APPLICATION NO. : 09/678165
DATED : June 20, 2006
INVENTOR(S) : Atarius et al.

It is certified that error appears in the above-identified patent and that said Letters Patent is hereby corrected as shown below:

On the Title Page, item (56), in Column 2, under "U.S. PATENT DOCUMENTS", Line 7, delete "B1" and insert -- B2 --, therefor.

Column 3, Line 26, insert -- ( -- before "implemented".

Column 4, Line 31, after "signal" delete "," and insert -- ; -- , therefor.

Column 5, Line 10, delete "ml/s" and insert -- m/s --, therefor.

Column 5, Line 65, delete "transmission" and insert -- transmission(s) --, therefor.

Column 6 , Line 24, after "matching" insert -- . --.

Column 6, Line 64, after "(D" insert -- ) --.

Signed and Sealed this

Eighteenth Day of December, 2007

JON W. DUDAS
*Director of the United States Patent and Trademark Office*